US008024210B2

(12) United States Patent
Weiss

(10) Patent No.: US 8,024,210 B2
(45) Date of Patent: Sep. 20, 2011

(54) METHOD FOR MANAGING GROUND ASSISTANCE TEAMS OF LOCOMOTIVE VEHICLES AND DATA TRANSMISSION SYSTEM THEREFOR

(75) Inventor: Francis Weiss, Clamart (FR)

(73) Assignee: Sagem Defense Securite, Paris (FR)

( * ) Notice: Subject to any disclaimer, the term of this patent is extended or adjusted under 35 U.S.C. 154(b) by 1342 days.

(21) Appl. No.: 10/398,781

(22) PCT Filed: Oct. 10, 2001

(86) PCT No.: PCT/FR01/03123
§ 371 (c)(1),
(2), (4) Date: Sep. 8, 2003

(87) PCT Pub. No.: WO02/31783
PCT Pub. Date: Apr. 18, 2002

(65) Prior Publication Data
US 2004/0061608 A1    Apr. 1, 2004

(30) Foreign Application Priority Data

Oct. 10, 2000 (FR) .................................... 00 12925

(51) Int. Cl.
*G06Q 10/00* (2006.01)

(52) U.S. Cl. ...................................... 705/7.13; 705/7.14

(58) Field of Classification Search ................. 705/7.13, 705/7.14
See application file for complete search history.

(56) References Cited

U.S. PATENT DOCUMENTS

| 5,475,594 | A  | * | 12/1995 | Oder et al. ...................... 701/14 |
| 5,615,121 | A  | * | 3/1997  | Babayev et al. .................. 705/9 |
| 5,913,912 | A  | * | 6/1999  | Nishimura et al. ............. 701/35 |
| 5,920,846 | A  | * | 7/1999  | Storch et al. ...................... 705/7 |
| 6,173,230 | B1 | * | 1/2001  | Camus et al. ................. 701/120 |
| 6,484,036 | B1 | * | 11/2002 | Sorkin et al. .................. 455/508 |

FOREIGN PATENT DOCUMENTS

| WO | WO 93 02433 | 2/1993 |
| WO | WO 00 35732 | 6/2000 |
| WO | WO 00 52550 | 9/2000 |

OTHER PUBLICATIONS

Mobile Data Solutions—www.mdsi-advantex.com webpages from web.archive.org dated Dec. 5, 1998.*
Lansa: KLM Royal Dutch Airlines uses LANSA to soar above competition. M2 Presswire. Coventry: Jul. 24, 2000 (proquest).*
Rockwell Collins: Rockwell Collins Aircraft Information Network System to be installed on Airbus A340-500/600 aircraft. M2 Presswire. Coventry: Jul. 28, 2000 (proquest).*

(Continued)

*Primary Examiner* — Johnna R Loftis
(74) *Attorney, Agent, or Firm* — Miles & Stockbridge, P.C.

(57) ABSTRACT

The invention concerns a method for managing ground assistance teams of a transport vehicle in a parking zone (19), wherein a management center (3) determines the tasks for the respective assistance teams and provides each team with data specifying its task, comprising the following steps: the management center (3) transmits task data over a radiotelephone network (10); the teams receive the respective data over terminals (15, 16) of the network, which presents the data to them; and after executing the tasks, the teams transmit back to the center (3), from the terminals (15, 16) task performance reports.

11 Claims, 1 Drawing Sheet

OTHER PUBLICATIONS

Klaus, L. "Gestaltungsfelder Beim Mobilfunk in der Arbeitsweltl" *ITG Fachberichte, VDE Verlag*, Berlin, DE, No. 124, 1994, pp. 399-410.

Shattil, S. et al. "Wireless Communication System Design for Airport Surface Management Part I: Airport Ramp Measurements at 5.8 Ghz" *IEEE*, New Orleans, LA, Jun. 18-22, 2000, New York, NY, pp. 1552-1557.

\* cited by examiner

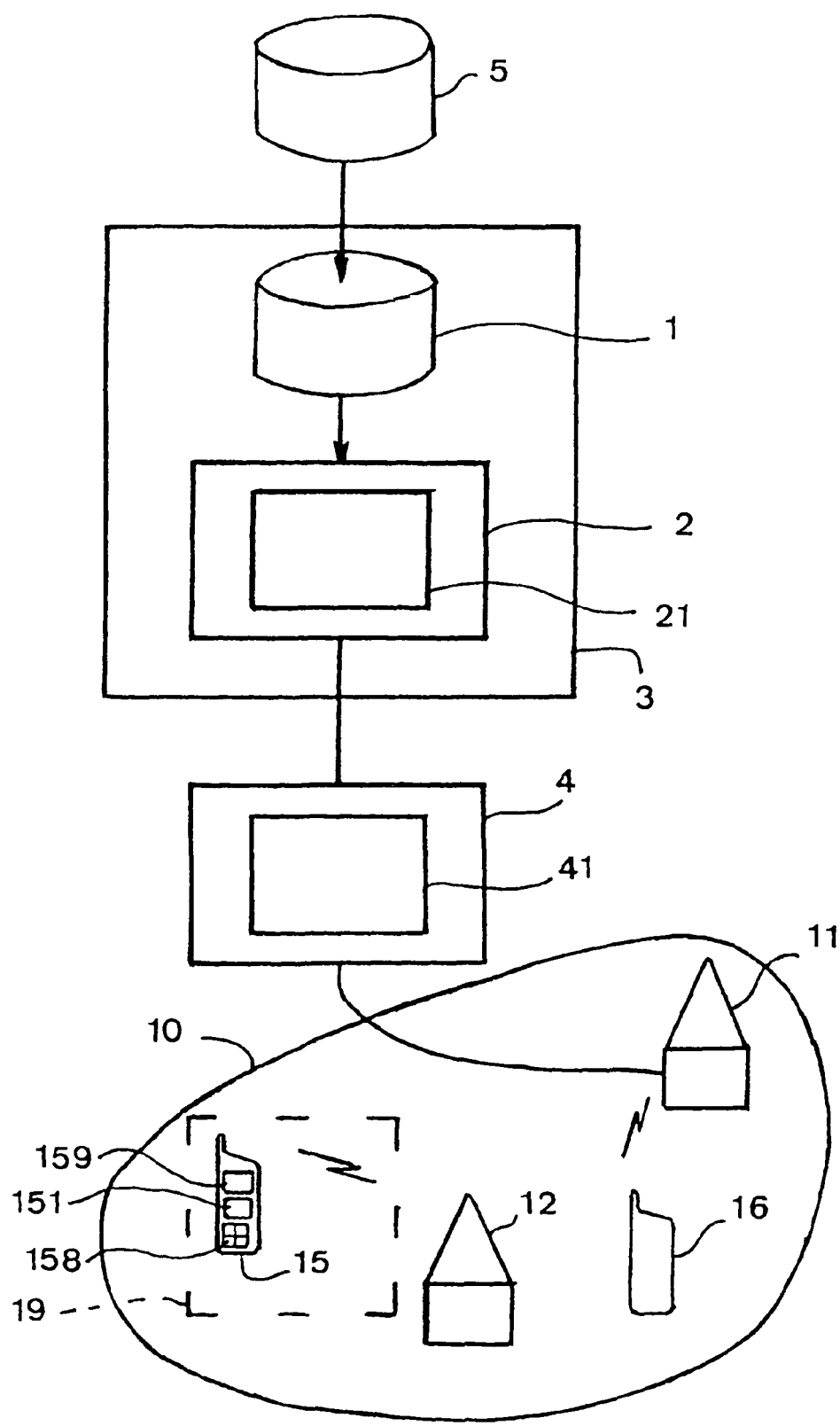
FIGURE UNIQUE

METHOD FOR MANAGING GROUND ASSISTANCE TEAMS OF LOCOMOTIVE VEHICLES AND DATA TRANSMISSION SYSTEM THEREFOR

The present invention relates to the management of ground support crews for transport vehicles such as aircraft, or also trains, buses and lorries.

If one takes the example of a fleet airliner, several runway teams, each engaged in different disciplines, tend to the aircraft in the parking area designated by the control centre. Each team is assigned a specific task, such as docking the boarding ramps, handling luggage, catering, electrical power, replenishing aviation fuel, and others.

The details of the tasks vary according to the type of aircraft. Thus the tasks take into account the next scheduled flight for the aeroplane.

In order to find out the nature of their tasks, the teams consult notice boards or fixed computer terminals that are located in the airport buildings and are controlled by the control centre. The information they access in this way identifies the arriving and departing flight, and the corresponding times, and provides complete details of the tasks associated with each. Since in practice the flight schedules are often at variance with the theoretical times, the teams are assembled in the parking area a long time before the theoretical arrival time. As a result, the teams are cut off from the control centre and so cannot be informed of any changes to the schedules, the tasks, or even the planned parking area.

Moreover, when the aeroplane has taken off again, the teams must submit a report on their work, which is used particularly by the airport operator for billing the airline in question. To avoid omissions and errors, these reports should be recorded immediately, in real time. However, they are written by hand and require inordinate effort, so that in practice the teams do not prepare them until the evening, when they have returned to their base. This leads inevitably to the omissions and errors indicated.

The aim of the present invention is to suggest a solution for improving management of support teams.

To this end, the invention relates primarily to a procedure for managing ground support crews for a transport vehicle in a parking area, according to which procedure a control centre assigns tasks for the respective support teams and provides each team with information specifying its task, the procedure being characterised in that
 the centre transmits the task information via a radio-telephone network,
 the teams receive their respective information on terminals connected to the network, which display the information to them, and when the tasks have been completed,
 the teams transmit their task completion reports back to the centre from the terminals.

Thus, management of the teams by the centre is adaptive since it takes place in real time, via wireless link.

The invention further relates to a system for transmitting data for the implementation of the procedure according to the invention, including:
 a radio-telephone network with mobile terminals for ground support teams,
 a team control centre, configured to transmit selectively to the terminals, via a network gateway, downloaded information with details on the respective tasks, and
 the terminals include means for receiving and transmitting to the centre uploaded information on reports regarding completion of their tasks.

The invention further relates to a mobile radio-telephone network terminal for a system according to the invention, wherein the means for receiving and transmitting reports include profession-specific application software for receiving and transmitting completion reports of a profession-specific task.

Finally, the invention relates to an electronic gateway for a system according to the invention, including software means for processing an application level protocol for the management of ground support teams, the exchange of data between a team control centre and a cellular radio-telephone network, to which the teams are linked.

The invention will be better understood with the aid of the following description of the data transmission system according to the invention for implementing the procedure according to the invention for managing ground support teams, with reference to the single FIGURE that represents the data transmission system.

The data transmission system of the present example is operated by the flight management agencies of a public airport. The system includes a database 1, with the list of schedule flights, belonging to a control centre 3 for ground support teams, each team covering a specific professional discipline and being assigned correspondingly with tasks. Control centre 3 includes a stack of profession-specific servers 2, which specify their tasks to the respective teams and coordinate their respective activities on the basis of the information from database 1.

Control centre 3 is linked to the support teams via radio, and specifically via a radio-telephone network 10 for mobile telephones, which in this case constitutes a GSM private cellular network for professional use covering the site of the airport in question and thus particularly the aircraft parking areas or zones, such as the parking area indicated by 19.

Control centre 3 is linked to network 10 via an electronic gateway 4 with two-way access and here including Wap functionalities, for processing application level data exchange protocols, and specifically in this case processing the present ground support team management application.

Here, gateway 4 is a stationary device linked by cable to a base station 11 of network 10. Each team leader has a GSM terminal 15, 16 for communicating with any of the base stations 11, 12 of network 10. In this example, GSM network is of type GPRS, in order to provide access to radio channels that have a digit rate higher than the standard 9.6 kb/s. Other radio networks complying with different standard standards are conceivable, for example such that are compliant with UMTS, WACS (Wireless Airport Communication System) in the 2.4 GHz band, or even DECT. As a variant, gateway 4 is a mobile terminal like those designated 15, 16, to the extent that it may access one or possibly more radio channels with digit rates capable of handling the anticipated data traffic. Additionally, network 10, whose stations 11, 12 may be mounted in containers, may be configured to use frequencies other than those of the GSM public network, so that it may be installed rapidly and without risk of interference.

In this example, a global database 5 includes the list of all scheduled flights and the characteristics of these flights, which is to say particularly their numbers and the designators of the starting and destination airports. Global database 5 provides local database 1 with a stream of data representing flights scheduled worldwide for the coming days. It may be noted that control centre 3 could have been located at a distance from the airport in question.

The management of aircraft ground support teams will now be explained in greater detail.

In general, control centre 3 determines the tasks for the respective ground support teams and provides each team with detailed information on the task. Control centre 3 transmits tasking information across network 10 and the teams receive the information on their respective terminals 15, 16, which display the information to the users thereof. In this example, the information is displayed on a screen 159 of terminal 15, controlled by a microprocessor—not shown—that allows eight lines of characters to be displayed in this case. Voice imaging or playback is also conceivable. Terminals 15, 16 are identical and therefore only terminal 15 will be described in detail. Upon completion of its task, each team transmits task completion reports back to control centre 3 from its terminal 15, 16. In control centre 3, the profession-specific servers 2 act as the link with terminals 15, 16. The information, or work or task orders, that are downloaded from control centre 3 to the screens 159 of terminals 15, 16 specify in this case the number of the arriving flight, its airport of origin its estimated time of arrival, the anticipated delay, the destination and scheduled time of its subsequent departure. This is then general information which is transmitted to all the teams involved with the aeroplane at issue.

The specific task of one of the teams, as displayed on screen 159, for example on a subsequent screen page, may for instance be to guide the aircraft to its designated parking area 19 after it has landed, chock the wheels, connect a generator cable to the aeroplane, check the fire extinguishers, dock the disembarkation ramps and to transport the luggage. The first page, containing general information, may be broadcast to all terminals 15, 16, whereas the following page is addressed exclusively to the terminal 15 (16) concerned with the task indicated on the second page of the task specification.

With regard to the task completion report, when it has completed all the activities associated with its assigned task, the team in question enters a message on screen 159 indicating for example that the disembarkation ramps were docked as prescribed, that the last item of luggage was removed from the cargo compartment fifteen minutes later and that the luggage was loaded onto the moving belt specified. After it is written, this message is uploaded to control centre 3 via network 10 and gateway 4.

To supplement the management information, database 1 of control centre 3 receives, as indicated, the data in the incoming stream that identifies the destination airports of flights all over the world, thus constituting sites including parking areas for aeroplanes, sites associated with the data on the respective scheduled movements of aircraft. As was indicated previously, this data identifies the departure and destination airports for the flights, for example "ROISSY". When it enters database 1, the data in the incoming stream is compared with the local data in database 1, identifying "ROISSY" airport, in this example, so that, in the event of a match between the local data and a related field in the incoming stream that specifies the scheduled destination airport ("ROISSY" or "ORLY", etc.), the data associated with the scheduled movement or flight can be extracted and then used to generate information about the corresponding tasks on the profession-specific servers 2.

Here, the information or data is exchanged, uploaded or downloaded, in network 10 as indicated, according to a Wap management application level protocol. For this purpose, gateway 4 includes software 41, associated with a processor—not shown—to manage the Wap protocol that processes the application for managing the ground support teams, that is to say for exchanging data between the profession-specific servers 2 and the various terminals 15, 16. In the download direction, from control centre 3 gateway 4 receives the information to be transmitted too terminals 15, 16, and manages the transmission thereof in cooperation with a corresponding Wap software 151, which is stored in the memory of the terminal 15, (16). For example, terminal 15 receives the first page, containing general information on the arriving flight, indicated earlier, then, by pressing a key on keyboard 158 of terminal 15, the team leader transmits a receipt acknowledgement to control centre 3. Control centre 3 then transmits the following page which contains specific details of the task for the team involved.

Regarding uploaded information, the team leaders transmit the completed task reports and, possibly ahead of time, any question or information concerning a task to be carried out. The reports are displayed in the form of one or more messages or screen pages 159.

Here, the Wap protocol ensures that control centre 3 sends a blank template page for the professional report upon request. WAP software 151 commands the microprocessor in terminal 15 to display the template on screen 159 and the team leader fills it out by pressing alphanumeric keys on a keypad 158. In a variation thereof, keypad 158 may include only numeric keys in addition to the function keys, and a data entry and code conversion program is associated with it to replace the omitted alphabetic keys functionally, by interpreting the number of successive actuations of each key to convert it to one letter of three possible letters associated with the key. When the report requires several blank templates ("screens"), WAP program 21 for control centre 3 and WAP program 151 for terminals 15, 16 are configured reciprocally to transmit a series of blank report template pages ("screens") to the terminal 15, (16) associated with a specified task or profession, and to transmit in return the completed page, upon the command of the microprocessor in terminal 15. WAP programs 21, 41, 151 are thus profession-specific application software.

In the terminals 15, (16), the WAP program 151 is installed on a removable subscriber identity module (SIM) card; alternatively, if large memory capacity is required, the WAP program may be stored in the read-only memory, for example installed in a battery pack on terminal 15. Specifically in this example, WAP programs 21, 41, 151 each include a fax application WAP software module that enables control centre 3 to transmit a fax image to screen 159 of terminal 15. In the other direction, that is to say uploading, a scanner may be provided, possibly integrated in terminal 15, with an optical sensor connector mounted on the housing of terminal 15, to capture document images (bar codes or similar) and transmit them to control centre 3. An image recording device, either still or video, might also be connected to or even installed in terminal 15, so that control centre 3 could be provided with written and visual information, perhaps even audio, at the same time. An operator in the control centre may thus be able to check on the progress of tasks and may also be informed of all incidents or accidents, and see the pertinent images so as to be able to instruct the teams on site to take specific actions or call emergency assistance.

In this example, it is further provided that network 10 make it possible to locate terminals 15, 16, which cooperate with stations 11, 12, and provide such information to control centre 3. For this purpose, the microprocessors in the terminals, 15 for example, contain geographic map data in their memory, including the position of the multiple stations such as those designated 11, 12 on network 10, in practice at least three. GSM radio circuits in terminal 15 receive the signals in the GSM grid, transmitted at a level determined by multiple stations 11, 12, and compare their levels, and thus the corresponding attenuations, to determine the relative distances between terminal 15 and the various stations 11, 12. It will be recalled that the amplitude of the radio field emitted by an emitter decreases linearly with distance. Thus, in the absence of obstacles, the relationships between the amplitudes of the different radio fields received by stations 11, 12 thus directly provide the required relative distance values. It is then only necessary to pinpoint the real position of terminal 15 corresponding to the relative distances determined above on an electronic map bearing the positions of stations 11, 12. An error due to an obstacle may be detected, and accordingly eliminated when the number of stations 11, 12 offers a redundancy in the input variables (amplitudes) of the positional calculation. Terminal 15 in this example then transmits its position to control centre 3 by radio.

In addition or alternatively, station 11, 12 which manages terminal 15, 16, that is to say the closest station in radio terms, assumes temporal control of terminal 15, 16 to ensure that it transmits its time channel signals with an advance offset relative to a reception reference grid of the station 11, 12 concerned, so that this advance makes up for the wave propagation time as far as station 11, 12 and they arrive exactly in the temporal channel provided in the grid. The value of the controlled advance offset represents directly the corresponding distance, the speed of propagation of radio waves in air being known. The station 11, 12 involved may thus provide an absolute distance directly and each of the absolute distances relating to the other stations 12, 11 may then be deduced by multiplying the absolute distance described above by the ratio of the two corresponding attenuations.

The invention claimed is:

1. A method that manages tasks for ground support teams for aircraft in aircraft parking areas of an airport, in which an airport control center determines profession specific aircraft-related tasks for respective support teams and provides each team with information specifying its tasks,
the method being characterized in that the control center transmits aircraft-related task information via a radio-telephone network, the teams receive respective information on terminals of the network which display the information to them, and when the tasks have been completed, the teams transmit task completion reports back to the center from the terminals,
the method being further characterized in that the control center continuously and automatically compares local aircraft-related data stored in a database of the control center with multi-airport aircraft-related data in an incoming data stream from a global database, including sites associated with data that identify parking areas for aircraft, and sites associated with data on scheduled movements of aircraft, to determine a data match between local aircraft-related data and multi-airport aircraft-related data in the incoming data stream, and in that profession specific servers in the control center are used, in the event of a data match, to generate and send automatically general flight information to all teams and profession specific tasks only to specific teams, and to coordinate tasks between the different teams on the basis of the data from the local database.

2. A system that manages ground support teams for aircraft in aircraft parking areas of an airport, the system comprising:
an airport control center that determines profession specific aircraft-related tasks for respective support teams and provides each team with information specifying its tasks;
a radio-telephone network by which the control center transmits the aircraft-related task information; and
mobile terminals by which the support teams communicate with the control center,
wherein the terminals have means for displaying information transmitted to them and have means for transmitting task completion reports back to the control center,
the control center has means for continuously and automatically comparing local aircraft-related data stored in a database of the control center with multi-airport aircraft-related data in an incoming data stream from a global database, including sites associated with data identifying parking areas for aircraft, and sites associated with data on scheduled movements of aircraft, to determine a data match between local aircraft-related data and multi-airport aircraft-related data in the incoming data stream, and
the control center further comprises profession specific servers adapted, in the event of a data match, to generate and send automatically general flight information to all teams and profession specific tasks only to specific teams, and to coordinate tasks between the different teams on the basis of the data from the local database.

3. The system according to claim 2, wherein the network is a type Global System for Mobile Communications, has a Wireless Application Protocol network gateway through which information is transmitted to the terminals.

4. The system according to claim 2 or claim 3, wherein the terminals include screens for displaying downloaded information and providing information messages to be uploaded.

5. The system according to claim 2 or claim 3, wherein the control center and the terminals include reciprocal management application software for transmitting blank report forms to the terminals and for transmitting completed forms back to the control center.

6. The system according to claim 2 or claim 3, wherein the terminals cooperate with stations to allow the positions of the terminals to be determined and transmitted to the control center.

7. The system according to claim 2, wherein the reports have profession-specific application software for receiving and transmitting completion reports of a profession-specific task.

8. The system according to claim 7, wherein the software is installed on a subscriber identity module card.

9. The system according to claim 7, wherein the software is installed in a battery pack.

10. The system according to any one of claims 7 to 9, wherein fax software is provided.

11. The system according to claim 3, wherein the network gateway has software means for processing an application level protocol management of ground support teams, the exchange of data between the control center and the radio-telephone network.

* * * * *